U. A. TOWNS.
SANITARY DAIRY PAIL.
APPLICATION FILED DEC. 31, 1909.
972,295.
Patented Oct. 11, 1910.
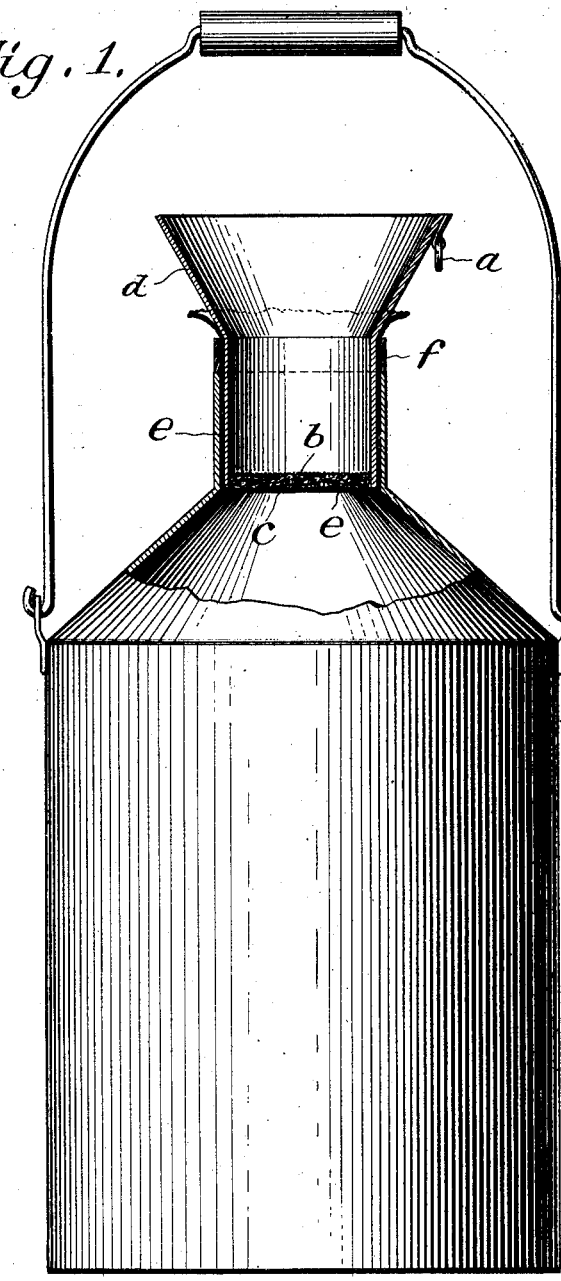
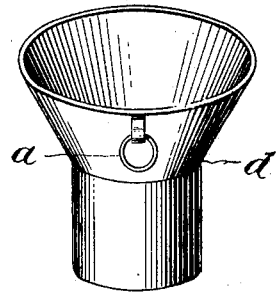
Witnesses:
Inventor:

UNITED STATES PATENT OFFICE.

ULYSSES A. TOWNS, OF HARRISON COUNTY, MISSOURI.

SANITARY DAIRY-PAIL.

972,295.   Specification of Letters Patent.   Patented Oct. 11, 1910.

Application filed December 31, 1909. Serial No. 535,898.

*To all whom it may concern:*

Be it known that I, ULYSSES A. TOWNS, a citizen of the United States, residing in Harrison county, State of Missouri, have invented a new and useful Sanitary Dairy-Pail, of which the following is a specification.

This invention relates to dairy pails and has for its object the provision of means whereby, as the cow is milked, the milk will pass directly into the pail, means being employed for filtering it as it enters the pail so that it will not become contaminated by filth such as has heretofore been allowed to remain in the milk until a sufficient quantity has been obtained to be filtered.

A further object is to provide a novel form of strainer or filter and funnel, the filtering material being readily removable from the funnel so that the parts can be quickly cleaned at any time and new filtering elements supplied whenever necessary.

A still further object is to provide a filter designed to be applied directly to the milk pail so that the milk will be filtered as fast as it passes into the pail.

A still further object is to provide improved means for holding the filtering materials upon the funnel or body portion of the strainer.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a central vertical section through a milk pail having the present improvements applied thereto. Fig. 2 is a perspective view of the funnel portion of the strainer. Fig. 3 is a perspective view of the holding ring used upon the strainer.

Referring to the figures by characters of reference A designates a dairy pail having a substantially frusto conical top from the center of which projects a cylindrical neck of any desired proportions. This neck is adapted to receive the strainer which constitutes the principal part of the present invention. Said strainer includes a funnel shaped body portion $d$, the said portion being provided with a cylindrical end adapted to fit within the end of the neck of the pail and having a partition $b$ therein adjacent the lower end thereof, said partition being formed of a fine wire fabric. A piece of cheese cloth or other similar fabric such as has been shown at $c$ is adapted to be stretched across the lower end of the body portion or funnel and to be clamped about the cylindrical portion of the funnel by means of a ring $f$. A filling of raw cotton, such as has been shown at $e$ is interposed between the partition and the lower portion of the cheese cloth strainer so that any milk passing through the screen $b$ must then pass through this raw cotton and then through the lower stretched portion of the cloth. A ring $a$ may be connected to the funnel so as to enable the same to be readily suspended from a hook or the like, when not in use.

The pail A may be provided with the usual bail which should be of sufficient size to swing over the funnel when it is in position upon the pail. When the parts are assembled the ring $f$ rests upon the end of the neck of the pail and thus supports the strainer while it, at the same time, tightly binds the cloth upon the outer surface of the cylindrical extension of the funnel.

In using the device the cotton is first placed under the partition and is then held in position by the straining cloth which is stretched across the end of the cylindrical extension and then clamped about said extension by the ring $f$. Said cylindrical extension is then forced into the neck of the pail and the fabric surrounding it will bind firmly upon the inner surface of the neck. Ring $f$ will bear downwardly on the neck and thus form a firm support for the strainer attachment. After the parts are thus assembled the pail is placed in position under the cow and the milk permitted to flow directly into the funnel shaped body $d$ and thence by gravity through the wire screen, the raw cotton, and the cheese cloth. Any undesirable particles commingled with the milk will thus be promptly separated therefrom and the danger of contamination is reduced to the minimum. To clean the device, the body portion $d$ is removed from the neck of the pail, the ring $f$ is slipped off of the body portion and the raw cotton and the cheese cloth or other fabric thus released. A new supply of raw cotton and cheese cloth can then be placed upon the body portion after which the parts can be reassembled in the manner hereinbefore set forth. The fabric surrounding that portion of the body within the pail bears with sufficient pressure upon the neck of the pail to prevent the strainer from falling out of the pail should the same be overturned from any cause. It will also be noted that the length of the cylindrical portion of the body $d$ is substantially equal to the combined length of the neck of the pail and of the clamping ring.

Various changes can of course be made in the construction and arrangement of the parts without departing from the spirit or sacrificing any of the advantages of the invention as defined in the appended claims.

What is claimed is:—

1. A strainer including a funnel-shaped body insertible into the neck of a pail, a filtering cloth extending across the lower end of and around the body, said cloth constituting means for frictionally engaging the neck of a pail to hold the strainer in said neck, and a ring surrounding the body portion and binding said fabric thereon, said ring constituting means for engaging the neck of a pail to support the body portion within the neck.

2. A strainer including a funnel-shaped body insertible into the neck of a pail, a fabric partition fixedly secured within the body above the bottom thereof, a filtering cloth extending across the bottom of the body and around said body, said cloth constituting means for frictionally engaging the neck of a pail to hold the body against displacement, a fibrous filtering material supported by said cloth and below the partition, and a ring for binding the fabric upon the body and supporting said body within the neck of a pail.

ULYSSES A. TOWNS.

Witnesses:
 Geo. L. Phillips,
 S. P. Davisson.